(12) United States Patent
Guddanti et al.

(10) Patent No.: US 7,131,646 B2
(45) Date of Patent: Nov. 7, 2006

(54) MEDIA ACCESSIBILITY IN A MEDIA PROCESSING DEVICE

(75) Inventors: Srinivas Guddanti, Boise, ID (US); Chet Butikofer, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1163 days.

(21) Appl. No.: 10/005,756

(22) Filed: Nov. 2, 2001

(65) Prior Publication Data

US 2003/0086130 A1 May 8, 2003

(51) Int. Cl.
*B65H 39/10* (2006.01)
(52) U.S. Cl. .................. 271/292; 271/294; 271/298
(58) Field of Classification Search ............... 271/292, 271/294, 298; 347/104, 218, 264; 399/403, 399/405
See application file for complete search history.

(56) References Cited

U.S. PATENT DOCUMENTS

| | | | | |
|---|---|---|---|---|
| 5,096,184 A | * | 3/1992 | Maekawa et al. | 271/288 |
| 5,186,454 A | * | 2/1993 | Kitahara | 271/288 |
| 6,155,563 A | * | 12/2000 | Ono et al. | 271/292 |
| 2001/0054793 A1 | * | 12/2001 | Nakahira et al. | 271/298 |

\* cited by examiner

*Primary Examiner*—David H. Bollinger

(57) ABSTRACT

A system and method for improved accessibility of media output from a media processing device. Media receivers are coupled to an actuator such that the media receivers can be moved under manual command by a user, or automatically by a controller. Movement selectors are provided for activation thereof by a user. The user selects a media receiver for movement, and then the desired direction of movement. The media receiver is moved to a position most convenient for the user so that the media in the media receiver is most accessible to that user. In an illustrative embodiment, a laser printer with a plurality of paper trays is adapted to the present invention.

15 Claims, 3 Drawing Sheets

MEDIA ACCESSIBILITY IN A MEDIA PROCESSING DEVICE

BACKGROUND OF THE INVENTION

1. Field of the Invention

The present invention relates to systems and methods for improving user accessibility in media processing devices. More specifically, the present invention relates to systems and methods for improving accessibility of media output from imaging, printing, and media handling devices.

2. Description of the Related Art

Improved accessibility for all individuals is a goal in the planning and design of many public and private environments. This is particularly true in office environments. In the past, the placement of controls and outputs of business machines have been driven by conventional design constraints and the physical needs of typical users. However, current accessibility enhancements are directed to meeting the physical needs a broader range of individuals. The prior approach to the placement of controls and outputs on business machines according to the needs of typical users has failed to meet the needs of challenged individuals.

An area of particular interest with respect to accessibility relates to the class of business machines that print text, images and photographs on physical media. The end product of these machines is typically some form of media, often paper, that is deposited onto a media receiver, such as an output tray, where it is collected by a user upon completion of a media processing job. A typical example of such a machine is the office laser printer.

As is well known in the art, the location of the output trays in modern laser printers is constrained by the printing mechanism and a particular point in the printing process where the printed media exits the printer. Of course, the mechanism can be configured in such a way that the typical user will have ready access to the media deposited in the output tray. For example, a laser printer may be designed such that a normal user walks to the machine to find the printed media in a tray that is located conveniently for grasping the printed media while standing adjacent to the printer. However, an output tray located for a normal individual that stands adjacent to a printer may not be convenient for those users who are physically challenged, such as by confinement to a wheel chair, or those whose mobility or stature does not fall within the range of typical individuals.

Even in the case where a user is of typical physical capabilities, the design of printers or office machines may dictate that the output tray or trays be placed at inconvenient locations. This is often true where a particular device has a plurality of trays. For example, a full-featured laser printer that is designed to serve a large group of users may have a collating output that places media into a plurality of trays located in positions from close to the ground up to positions at the top of the printer. Depending on which tray a particular print job is deposited into, the location of a completed print job may or may not be conveniently positioned for a typical users and may be especially inconvenient for a challenged user.

There are a number of other exemplary business machines, including inkjet printers, copying machines, facsimile machines, image processing machines, mailing equipment and others that suffer from the aforementioned limitations of accessibility. Thus there is an ongoing need in the art for a system and method for improving the accessibility of media output by media processing devices

SUMMARY OF THE INVENTION

The need in the art is addressed by the apparatus and methods of the present invention. A media processing device with enhanced accessibility of media processed thereby is taught by the present invention. The media processing device includes a frame with a media receiver moveably coupled thereto. An actuator is coupled to the frame and the media receiver and an output selector is provided to activate the actuator to move the media receiver with respect to the frame upon activation thereof.

In a specific printing embodiment, the media receiver is a paper tray that is coupled to move along a linear path. The linear path is vertically oriented with respect to the frame and the media receiver is moveably coupled to the frame by linear guides. In this embodiment, the actuator is an electric motor, which is coupled to the media receiver through an arrangement of cables and pulleys.

In a refinement, the output selector further includes a first switch operable to activate the actuator to move the media receiver in a first direction (e.g., up) and a second switch operable to activate the actuator to move the media receiver in a second direction (e.g. down). In one mode of operation, the output selector is operable to activate the actuator only so long as the output selector is held in an operating position. To prevent the media receiver from moving away from the media receiving position, the output selector is disabled from activating the actuator while the media processing device is processing media.

In a further refinement, the media processing device includes a controller coupled to the output selector for receiving a command to activate the actuator and coupled to the actuator for actuation thereof. The media receiver is located in a first position while the media processor is processing media and the controller is operable to automatically return the media receiver to the first position prior to commencement of the processing of media. In another refinement, the media processor further includes a second selector located on the frame at a different position from the selector to allow greater ease of accessibility of the selector.

In a multiple media receiver improvement of the present invention, the media processor further includes a second media receiver moveably coupled to the frame, and the actuator is further coupled to the second media receiver. The output selector further includes a media receiver selector coupled to select which of the media receivers the actuator is activated to move. To facilitate the user identifying which media receiver is selected the media processing device further includes a media receiver indicator coupled to the media receiver selector for indicating which of the media receivers is presently selected. In a refinement, the media receiver indicator comprises a plurality of individual indicators located adjacent to their respective media receivers.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches an apparatus and method for improving accessibility to media that is output from a media processing device. As noted above, the prior art has placed media output receivers in locations that were dictated by the design of the media processing device with an eye toward meeting the accessibility needs of typical users. The present invention utilizes one or more moveable media receivers that can be moved through actuation of an actuator to positions offering better accessibility depending on the particular user's needs. The actuation is accomplished by activation of a selector that provides, among other functions, control over the actuator to move the media receiver until it reaches a desired position. Once the desired position is reached, the user deactivates the selector and movement of the media receiver stops. The user then can retrieve the media output by the media processing device from a location that is most conveniently accessible to that user. The foregoing represents a single approach to utilization of the present invention. It will become clear hereinafter that these teachings are applicable to wide variety of media processing devices of varying degrees of complexity.

Figure 1:
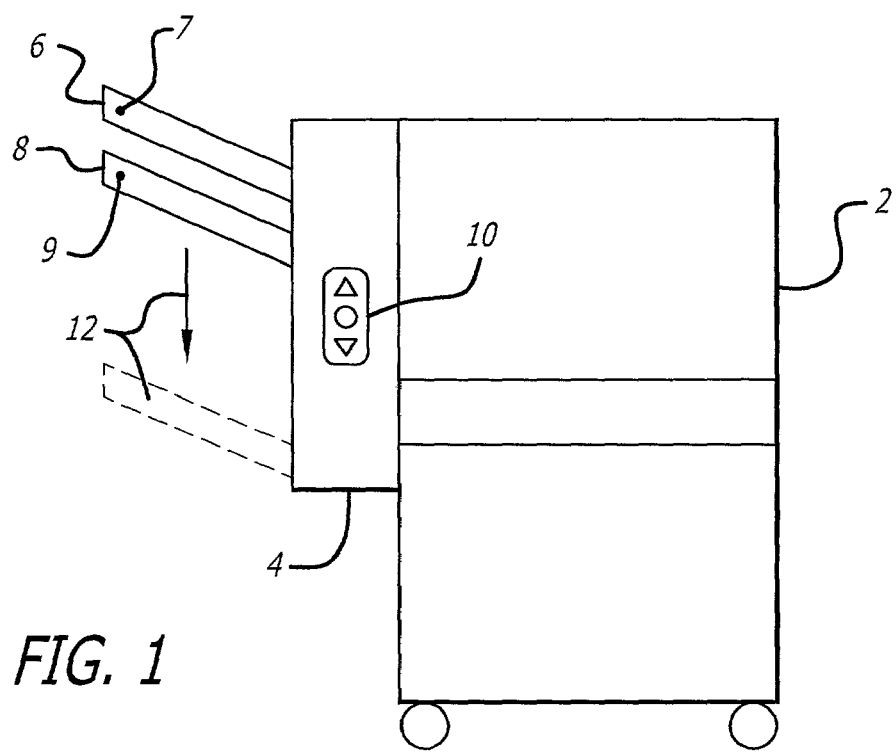
FIG. 1 is a front view of a printing device according to an illustrative embodiment of the present invention.

An illustrative embodiment media processing device 2 is shown in FIG. 1. This embodiment is a high capacity laser printer that prints high volumes of paper media to plural media receivers in the form of paper trays 6, 8. A media output mechanism 4 is attached to a frame of the media processor 2 and supports one or more media receivers like 6, 8. A selector 10 is disposed on the output mechanism 4 at a location that is near the middle range of positions and best suited for a wide range of users. The selector 10 includes an "UP" selector and a "DOWN" selector that cause an actuator in the media output mechanism to move a selected media receiver up and down respectively. When a media processing job is completed by the media processor 2, the user selects one of the papers trays 6, 8 with a selector actuator on selector 10. Each paper tray 6, 8 includes and LED indicator lamp 7, 9 respectively, which indicates to the user which of the trays 6, 8 has been selected for movement. The user then activates the desired selector to move 12 the media receiver 6 or 8, with the media, to a convenient location for subsequent retrieval. Note that the extent of movement 12 of the media receivers 6, 8 is defined by the size of the media output mechanism 4, and that the selector 10 controls are placed near the middle of the media output mechanism 10. This approach employs a single selector panel 10 since the length of the media output mechanism 4 is of reasonable dimension so that most users will be able to access the selector panel 10.

Figure 2:
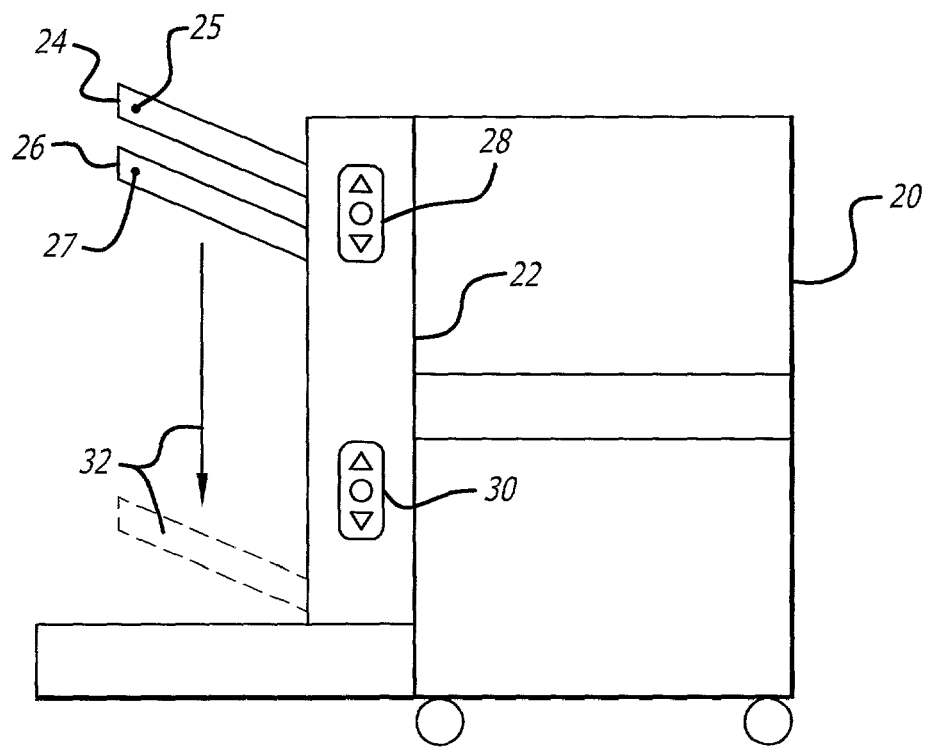
FIG. 2 is a front view of a printing device according to an alternative embodiment of the present invention.

FIG. 2 depicts and illustrative embodiment printer 20 that has a longer media output mechanism 22 than the previous embodiment. This length implies that the media receivers 24, 26 can travel a greater distance 32, and thus satisfy the needs of a great range of user accessibility needs. Each media receiver 24, 26 includes a indicator LED 25, 27 respectively that indicates to the user which of the tray media receivers 24, 26 is presently selected. Two selector panels 28, 30 are placed at two separate locations along the length of the media output mechanism 22 so that users can access either of the selector panels 28, 30 that is most accessible to them. Note that the functions of the two selector panels 28, 30 are the same and operate in parallel such that either selector panel can be accessed to provide identical functions. These functions include the selection of one of the media receivers, and the up and down movement selectors.

In both illustrative embodiments shown in FIG. 1 and FIG. 2, the travel of the media receivers is linear and vertical. These designs allow a greater range of individuals to access the media output from the media processing devices (printers) whether they are of various statures or confined to various means of mobility, such as wheel chairs, and et cetera. Also, the use of linear, vertical output media systems is known in the art, such as are used by automatic collators and automatic media management systems. However, the teachings of the present invention are equally applicable to other output media receiver arrangements. Horizontal linear systems, circular systems, and other mechanical systems are readily adaptable to the teachings herein. Movement of the media receivers by manual selection of the user that is beneficial for the accessibility of the user can be implemented in any output mechanism known to those skilled in the art or that later become available.

The selector panels 10, 28, and 30 share certain features in the illustrative embodiments. There are two direction selectors that allow the user to manually select the direction and cause the movement of one or more of the media receivers. In the two illustrative embodiments, these selectors are up and down arrows, which indicate the up and down directions of movement. While the user is activating one of these direction selector controls, the presently active media receiver is moved by an actuator (not shown) in the media output mechanism 4, 22 in the selected direction. Movement continues so long as the selector is active, or until a limit of travel is reached. When the desired location of the media receiver is reached, the user deactivates the selector and the actuator ceases movement of the media receiver such that the media receiver stops at a convenient location for access to its contents. In the case of a media processing device that has a single media receiver, the two direction selectors are sufficient for the desired movement control of the media receivers. However, in the case where there are plural media receivers, it is useful employ an additional selector dedicated to allowing the user to specify which of the media receivers are to be moved by activation of the direction selectors. This function is illustrated by the circular selector in the selector panels 10, 22, and 30 shown in FIG. 1 and FIG. 2. In this embodiment, the user first specifies which media receiver to move and then moves the media receiver using the direction selectors.

Figure 3:
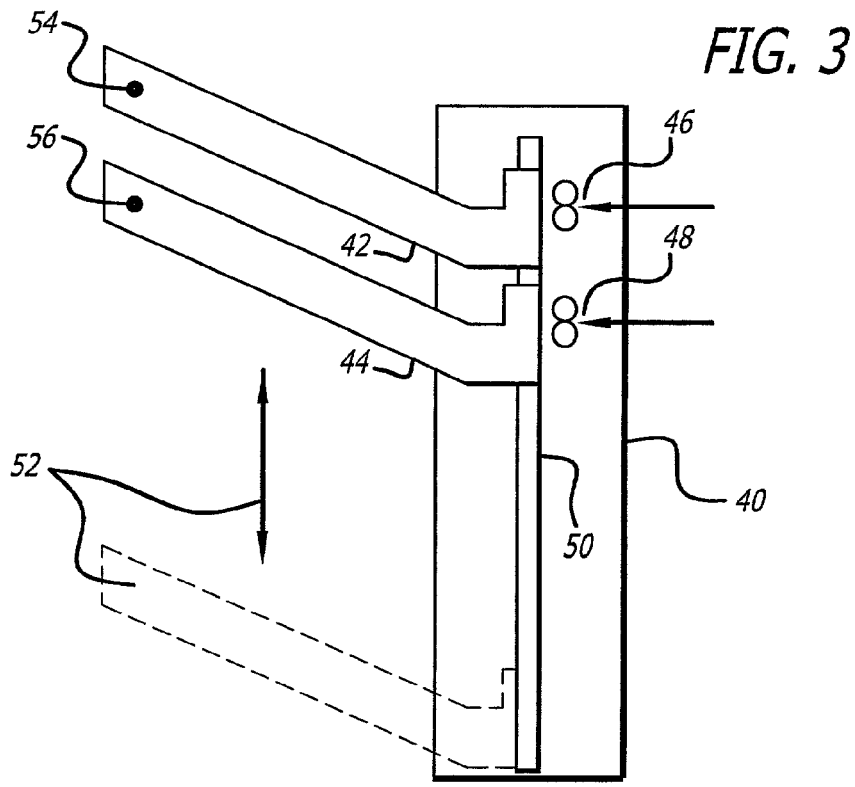
FIG. 3 is a section view of an output tray mechanism according to an illustrative embodiment of the present invention.

Attention is directed to FIG. 3, which is a cross-section view of a media output mechanism 40 in an illustrative embodiment of the present invention. The media output mechanism 40 receives media output from a media process in a media processing device (not shown) to which the media output mechanism 40 is attached. Essentially, the frames of the two devices are coupled together into a single unit. Of course, the media output mechanism and the media processing device could be built as a single unit, having a single frame. In an illustrative embodiment, the media processing device is a high capacity laser printer which typically prints text and images onto paper media (the media process). The final output of the printer is through a pair of pinch roller sets 46 and 48 that force each sheet of paper out onto paper trays 42 and 44 respectively. The location of the pinch roller sets 46 and 48 are fixed in position with respect to the printer frame, and therefore, the paper trays 42 and 44 is positioned to receive the output sheets of paper as the print processes commences. It is clear that absent a more complex mechanism to route the paper media to different locations, the paper trays 42 and 44 must be held in the proper position to receive the paper sheets during the print process.

Once the print process is completed, the paper trays 42, 44 can be moved 52 anywhere along the extent of their travel range. The extent of the range of travel of the paper trays 42 and 44 is defined by one or more linear guides 50 that constrain the movement of the paper trays along the vertical dimension of the guide(s) 50. Since the trays 42, 44 are not able to pass by each other in the guide, in the illustrative embodiment, the lower tray 44 must move in advance of or in unison with the upper tray 42 while downward motions if accomplished. Similarly, the upper tray 42 must move in advance of or in unison with the lower tray 44 while upward motion is accomplished. Various coupling and clutch arrangements are known, or will occur to, those skilled in the art to accomplish the relational movement of the upper and lower trays. It is to be understood that the trays 42 and 44 can move independently of one another. In this way, one of the trays can be held in a fixed position to receive media (paper) from the media processing device (the printer) while the other tray is moved for improved accessibility according to the teachings of the present invention. Each tray 42 and 44 has an indicator, 54 and 56 respectively, attached to it or located adjacent to it so that the user receives a visual queue as to which tray is active at any given instant. In the illustrative embodiment the indicators are LED's. The details of the operation of these indicators 54, 56 will be more fully discussed hereinafter.

Figure 4:
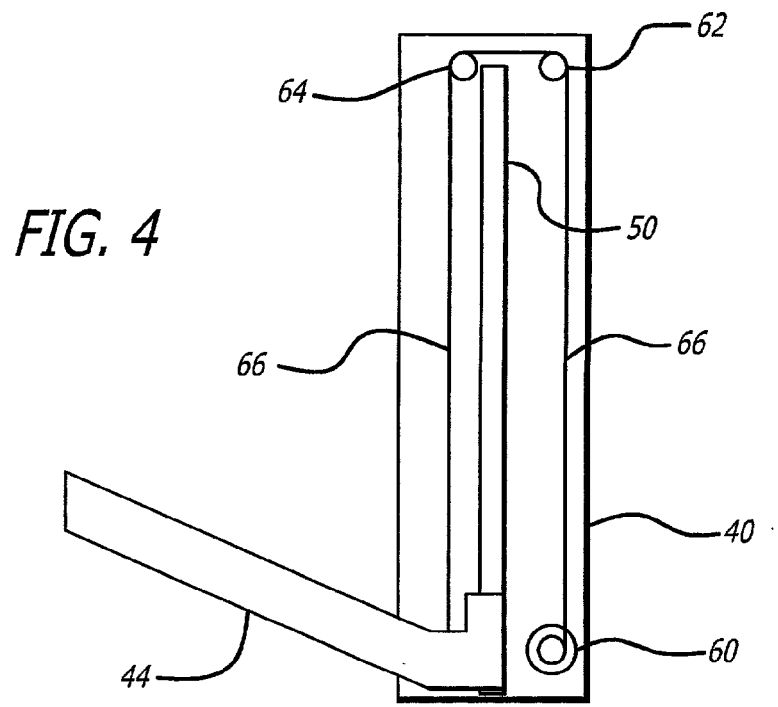
FIG. 4 is a detail view of the tray moving mechanism according to an illustrative embodiment of the present invention.

FIG. 4 details an illustrative embodiment mechanism for coupling a media receiver (tray) 44 to an actuator 60. The actuator 60 is a motor with a cable reel that winds or unwinds cable 66 depending on the direction of rotation of the motor. Guide pulleys 62 and 64 are employed to route the cable 66 between the actuator 60 and the media receiver 44. The pulleys 62, 64, and actuator 60 are coupled to the media output mechanism frame 40. The cable 66 is routed in a vertical orientation as it rounds the upper pulley 64 and couples to the media receiver 44. This arrangement provides that the winding and unwinding of cable 66 to and from the actuator 60 will cause upward and downward movement of the media receiver, respectively. The vertical movement of the media receiver is constrained by vertical guide 50. When the up selector is activated, the motor turns to wind the cable 66 and causes the media receiver 44 to move up. Conversely, when the down selector is activated, the motor turns to unwind the cable 66 causing the media receiver 44 to move down. The limit of travel can be accomplished by physical travel stops or through the use of limit switches that sense position of the media receiver as it moves. Those skilled in the art will appreciate the advantages of using limit switches when there are plural media receivers, or where a controller is employed to manage the movement of the media receivers under software control. Limit switches can sense both the extent of the travel guide(s) 50 and the presence of another media receiver so that the actuator 60 can be stopped when appropriate. Limit switches can also be used to sense the fixed positions of the media receivers, which is useful for positioning the media receivers to receive media from the media processing device.

The present invention can be implemented with a substantially mechanical or substantially electromechanical system. The foregoing discussion is an illustration of this approach. Those skilled in the art will appreciate that a controller-based approach has many advantages.

Figure 5:
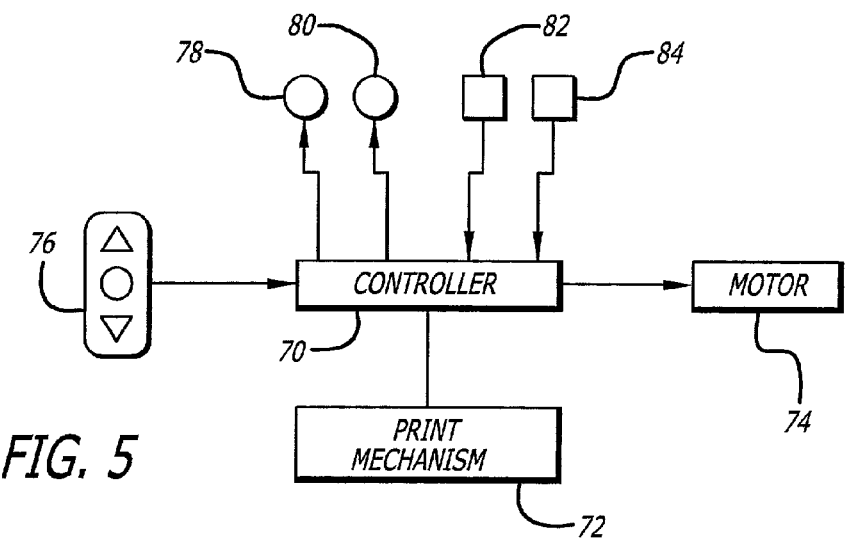
FIG. 5 is a functional block diagram of a printing device in an illustrative embodiment of the present invention.

FIG. 5 is a functional block diagram of a controller-based system according to the teachings of the present invention. The controller 70 may be implemented with any of a variety of circuits, processors, microprocessors, computers, microcomputers, microcontrollers, signal processors, or other programmable device known to those skilled in the art. The function of the controller 70 is programmable and is embodied as executable software designed to accomplish the described control sequences. Those skilled in the art are aware of programming techniques and languages useful for such applications. The controller receives as input the user activations of selector 76. As noted herein before, these include the "UP" command, the "DOWN" command and the selection of one of a plurality if trays desired by the user to be moved. The controller 70 is coupled to control the motor 74 actuator actuation directions (e.g. up or down). Thus, the activation of the "UP" command may cause the controller 70 to actuate the motor 74 in the up direction of rotation. The controller 70 is also coupled to the print mechanism (media process device) 72 so that the controller is enabled to receive data indicating the status of a media process, including the start, duration, operation, and completion thereof. The controller is coupled to drive one or more indicators that indicate which of a plurality of media receivers are presently selected. In the illustrative embodiment, this is accomplished for two paper trays (items 42 and 44 in FIG. 3) with the use of two indicator LED's 78 and 80. The indicator LED's are correspondingly illustrated as items 54 and 56 in FIG. 3. The indicator LED's are advantageously positioned on or adjacent to the media receivers that they correspond to so that the user can readily identify which of the media receivers is presently selected.

The controller 70 in FIG. 5 is also coupled to receive input from a plurality of limit switches, represented by two limit switches 82 and 84 in FIG. 5. The limit switches are employed to detect limits of travel of the media receivers, to locate fixed positions of media receivers, and to indicate the presence of adjacent media receivers. The limit switch signals input to controller 70 are used in combination with the software to provide control of the movement of the media receivers. For example, if a user has activated the "DOWN" selector 76 for a paper tray, the tray will continue in a downward direction until the user deactivates the "DOWN" selector, or until a limit switch indicative of the maximum downward position of the selected media receiver has output a signal to the controller 70 indicating that the maximum downward position has been reached. Similarly, movement may continue until the position of an adjacent media receiver has been reached, which causes another limit switch to output a signal indicating the interference in the travel path of the active media receiver. Regarding the fixed position of the media receivers, limit switches are placed to provide a signal indicative of the proper position of each media receiver for receiving media from the media processing device during the processing of media. Those skilled in the art will appreciate that other applications of limit switch indicators could be readily applied as well. Also, other forms of sensor known to those skilled in the art could be readily employed, such as optical sensors, Hall effect sensors, and other sensor technologies.

Figure 6:
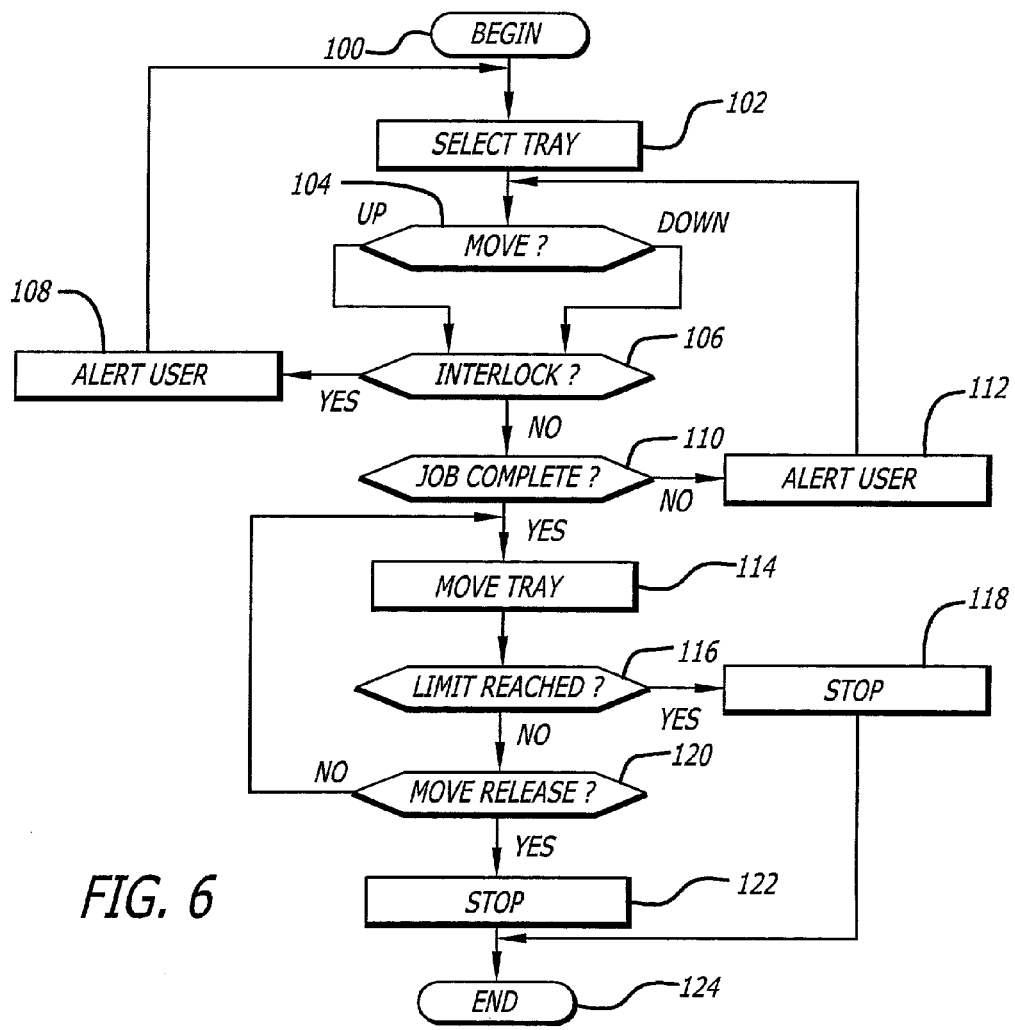
FIG. 6 is a flow diagram according to an illustrative embodiment of the present invention.

FIG. 6 is a process flow diagram of an illustrative embodiment of the present invention in a laser printer application. The flow diagram begins at step 100 when called from some other routine in the controller and proceeds to step 102 where the user activates the tray selection selector. If the user fails to make a selection, the default tray is automatically selected for the user, with suitable indication to the user as noted herein before. At step 104, the user activates either of the "UP" or "DOWN" selectors to move the selected tray. In either case, flow proceeds to step 106 where the controller checks the limit switches to determine if an interlock condition exists. A typical interlock is produced by a software or hardware limit condition. For example, if the selected paper tray was above another tray, and downward movement was required, a mechanical limit switch would provide and indication, and thus an interlock, that movement was not possible. Another example would be where a paper tray had reached the physical limit of its travel range, yet the user still selected movement beyond that physical limit. If an interlock condition does exist, the selected tray cannot be moved, and the user is so notified at step 108. In an illustrative embodiment, this alert is provided by flashing the indicator associated with the presently selected media tray. Flow then recirculates to step 102 to allow the user to select an alternative tray, if desired.

On the other hand, at step 106, if no interlock condition exists, then the controller checks with the printing mechanism to determine if the printing job associated with the selected tray has completed, which indicates that no additional media is going to be output to the selected tray. If the print job is not yet complete, the user is alerted at step 112 and flow recirculates to step 104, where it awaits completion of the job and subsequent movement actuation by the user. On the other hand, if the print job is complete at step 110, then the controller actuates the actuator to move the tray in the desired direction at step 114. While moving the selected tray, the controller monitors for any signal from a relevant limit switch at step 116 to determine if a movement limit has been reached. If a limit is reached, then flow proceeds to step 118 where the controller stops the actuator from further movement of the selected tray, and, the process ends at step 124. On the other hand, at step 116, if no limit has been reached, then the controller checks to determine if the user has released the selector at step 120. If not, flow recirculates to step 114 and the tray movement proceeds. On the other hand, at step 120, if the selector has been released then the actuator is stopped at step 122 and the process ends at step 124.

Thus, the present invention has been described herein with reference to a particular embodiment for a particular application. Those having ordinary skill in the art and access to the present teachings will recognize additional modifications applications and embodiments within the scope thereof. For example, a memory may be added and user preferences stored for automatic reconfiguration on the activation of appropriate controls.

It is therefore intended by the appended claims to cover any and all such applications, modifications and embodiments within the scope of the present invention.

What is claimed is:

1. A media processing device with enhanced accessibility of media processed thereby, comprising:
   a frame;
   a media receiver moveably coupled to said frame;
   an actuator coupled to said frame and said media receiver; and
   an output selector coupled to activate said actuator to move said media receiver with respect to said frame upon activation thereof, wherein said output selector further comprises a first selector operable to activate said actuator to move said media receiver in a first direction and a second selector operable to activate said actuator to move said media receiver in a second direction.

2. The invention of claim 1 wherein said media receiver is a paper tray.

3. The invention of claim 1 wherein said media receiver is coupled to move along a linear path.

4. The invention of claim 3 wherein said linear path is vertically oriented with respect to said frame.

5. The invention of claim 3 wherein said media receiver is moveably coupled to said frame by linear guides.

6. The invention of claim 1 wherein said actuator is an electric motor.

7. The invention of claim 6 wherein said motor is coupled to said media receiver through an arrangement of cables and pulleys.

8. The invention of claim 1 wherein said first direction is up and said second direction is down.

9. The invention of claim 1 wherein said output selector is operable to activate said actuator only so long as said output selector is held in an operating position.

10. The invention of claim 1 wherein said output selector is disabled from activating said actuator while the media processing device is processing media.

11. The invention of claim 1 further comprising a second selector located on said frame at a different position from said selector.

12. The invention of claim 1 further comprising:
   a second media receiver moveably coupled to said frame; wherein said actuator is further coupled to said second media receiver; and wherein said output selector further comprises a media receiver selector coupled to select which of said media receivers said actuator is activated to move.

13. The invention of claim 12 further comprising a media receiver indicator coupled to said media receiver selector for indicating which of said media receivers is presently selected.

14. The invention of claim 13 wherein said media receiver indicator comprises a plurality of individual indicators located adjacent to their respective media receivers.

15. A media processing device with enhanced accessibility of media processed thereby, comprising:
   a frame;
   a media reciever moveably coupled to said frame;
   an actuator coupled to said frame and said media receiver;
   an output selector coupled to activate said actuator to move said media receiver with respect to said frame upon activation thereof;
   a controller coupled to said output selector for receiving a command to activate said actuator, and coupled to said actuator for actuation thereof, and wherein
   said media receiver is located in a first position while said media processor is processing media, and wherein
   said controller is operable to automatically return said media receiver to said first position prior to commencement of processing of media.

* * * * *

UNITED STATES PATENT AND TRADEMARK OFFICE
CERTIFICATE OF CORRECTION

| | | |
|---|---|---|
| PATENT NO. | : 7,131,646 B2 | Page 1 of 1 |
| APPLICATION NO. | : 10/005756 | |
| DATED | : November 7, 2006 | |
| INVENTOR(S) | : Srinivas Guddanti et al. | |

It is certified that error appears in the above-identified patent and that said Letters Patent is hereby corrected as shown below:

In column 8, line 53, in Claim 15, delete "reciever" and insert -- receiver --, therefor.

Signed and Sealed this

Sixteenth Day of December, 2008

JON W. DUDAS
*Director of the United States Patent and Trademark Office*